(12) United States Patent
Escobar-Y-Gamboa et al.

(10) Patent No.: US 6,179,940 B1
(45) Date of Patent: Jan. 30, 2001

(54) BONDING SYSTEM FOR GLAZING ASSEMBLIES AND A PROCESS FOR ITS MANUFACTURE

(75) Inventors: Jose-Edmundo Escobar-Y-Gamboa, Puebla; Felipe Solis-Oba, Estado de México, both of (MX)

(73) Assignee: Vidrio Plano de Mexico, S.A. DE C.V., Tlalnepantla (MX)

( * ) Notice: Under 35 U.S.C. 154(b), the term of this patent shall be extended for 0 days.

(21) Appl. No.: 09/245,151

(22) Filed: Feb. 4, 1999

(51) Int. Cl.$^7$ .................................................. B60J 1/02
(52) U.S. Cl. .................... 156/108; 156/310; 52/204.591; 52/204.597; 296/93
(58) Field of Search ................................ 156/108, 322, 156/308.6, 310, 314, 293; 296/84.1, 93, 146.15, 190.1, 201; 52/204.591, 204.597

(56) References Cited

U.S. PATENT DOCUMENTS

| | | | |
|---|---|---|---|
| 2,579,072 | 12/1951 | Harris | 20/69 |
| 3,381,340 | 5/1968 | Chapin, Jr. | 18/36 |
| 3,416,833 | 12/1968 | Griffin | 296/93 |
| 3,759,004 | 9/1973 | Kent | 52/400 |
| 4,139,234 | 2/1979 | Morgan | 296/84 |
| 4,364,214 | 12/1982 | Morgan et al. | 52/311 |
| 4,405,174 | 9/1983 | Yamane et al. | 296/201 |
| 4,441,755 | 4/1984 | Endo et al. | 296/93 |
| 4,571,278 | 2/1986 | Kunert | 156/108 |
| 4,839,122 | 6/1989 | Weaver | 264/129 |
| 4,910,071 | 3/1990 | Kunert | 428/192 |
| 5,264,270 | * 11/1993 | Agrawal | 428/192 |
| 5,620,648 | * 4/1997 | Volkmann et al. | 264/511 |
| 5,846,996 | * 2/1999 | Veldman et al. | 52/240.597 |

* cited by examiner

Primary Examiner—Michael W. Ball
Assistant Examiner—John T. Haran
(74) Attorney, Agent, or Firm—Abelman, Frayne & Schwab

(57) ABSTRACT

A bonding system for glazing assemblies for mounting a glass pane on a bay of a vehicle, comprising: a first film of a coupling agent, bonded to a portion of a glass pane; a second film of a primer bonded to said first film; a gasket formed on a portion of the second film, adhered to said second film; a third film of a chemical extender, on a portion of the gasket and on a portion of the second film, bonded to said portion of the gasket and said portion of the second film and linking them to each other; a projecting molding of a sealant on said third film, bonded to said third film; a chemical coating, bonded to a bay of a vehicle; and a fourth film of a primer, bonded to said chemical coating, to be bonded in turn with the sealant, firmly retaining adhered the glass pane to the bay of the vehicle.

5 Claims, 4 Drawing Sheets

BONDING SYSTEM FOR GLAZING ASSEMBLIES AND A PROCESS FOR ITS MANUFACTURE

BACKGROUND OF THE INVENTION

1. Field of the Invention

This invention relates to a bonding system for glazing assemblies and, more specifically, to a bonding system including a bonding structure both at a glass pane and at the bay of a vehicle, in order to bond the glass pane at said bay of the vehicle.

2. Description of the Related Art

There are various structures and processes for mounting a glass pane in a bay of a vehicle.

Some of those structures comprising a gasket held or adhered to the edge of the glass and including some implements, such as screws or the like, embedded into the gasket, to be firmly mounted on the bay of the vehicle.

Examples of those structures are disclosed in the U.S. Pat. No. 2,579,072 of Harris; U.S. Pat. No. 3,381,340 of Chapin; and U.S. Pat. Nos. 4,139,234 and 4,364,214, both of organ.

Other structures include a gasket wherein the implements for holding the glass pane are of a similar material as the gasket, to be introduced on a mass of adhesive applied to the bay of the vehicle, such as for example those disclosed by the U.S. Pat. No. 3,416,833 of Griffin; U.S. Pat. No. 4,405,174 of Yamane et al; and U.S. Pat. No. 4,441,755 of Endo.

Since many years it has been a desirable extended use of structures which are just adhered or glued to the bay of the vehicle, which greatly simplifies the mounting process of the glass panes in the vehicle.

An example of the above disclosed types of structures is disclosed in U.S. Pat. No. 3,759,004 of Kent which, as illustrated in FIG. 10 of said patent, includes a trim strip (6) which is held at an edge of a glass pane by a retaining clip (10) and/or by an adhesive layer (17), and then a mass of adhesive (5) is applied to the external surface of the trim strip, in order to be adhered or glued to the bay of the vehicle.

Another similar or equivalent structure is disclosed in U.S. Pat. No. 4,571,278, wherein a first bead of adhesive material (5) is deposited on a portion of a glass pane (1), which is allowed to harden, and then a second bead of adhesive (7) is superimposed on the first hardened bead of adhesive, in order to simply adhere this structure to the bay of the vehicle until the second bead hardens.

Other simplified structures for mounting the glass pane to the bay of a vehicle are disclosed in U.S. Pat. No. 4,839,122, of Weaver, in which at FIG. 3, it is illustrated an structure comprising a gasket (22) adhered to the edge of the glass pane, formed by the known "Reaction Injection Molding", and a rib or dam member (26) formed separately from the gasket, as a barrier for an adhesive material (40) deposited on the glass pane, by which the glass structure is adhered or glued to the bay of the vehicle, which is similar or equivalent to the structure disclosed in U.S. Pat. No. 4,910,071 of Kunert, which includes at least a barrier (2) formed by a settable adhesive mass extruded onto one surface of the glazing, parallel to said outer edge, to retain a bead of glue deposited directly onto the surface of the glazing, to be glued directly to the bay of the vehicle.

These structures, although disclose that the adhesive masses are deposited directly on the gasket or on the first hardened adhesive mass or gasket, both the gasket or the so named adhesive beads, are not strictly adhesive materials because many of them can be separated from the glass pane simply by slightly pulling said gasket with the fingers of a person, and therefore a primer or other adhesion promoter agent have been strictly necessary.

However, up to now, none of the known structures disclose nor remotely suggest an structure in which the adhesive forces are deeply considered.

In accordance with the present invention, a bonding system for glazing assemblies is provided, comprising a series of inter-actuating films and components each of which has specific and selective bonding properties which are compatible to be adhered to a neighbor component both on an under the same, and which imparts a reliable and strong adherence and sealing properties to this glazing system.

Furthermore, a suitable process for the manufacturing of said bonding system for glazing assemblies is also provided in accordance with the present invention, by which said reliable and strong adherence and sealing properties thereof is suitable achieved and which, because of the type of components intervening in the system, can be produced in a continuous production line including a molding equipment which simplifies and accelerates the production process.

SUMMARY OF THE INVENTION

It is therefore a main object of the present invention, to provide a bonding system for glazing assemblies, comprising a series of inter-actuating films and components each of which has specific and selective bonding properties which are compatible to be adhered to a neighbor component both on and under the same;

It is also a main object of the present invention, to provide, a bonding system for glazing assemblies, of the above disclosed nature, which imparts a reliable and strong adherence and sealing properties to the glazing system.

It is additionally a main objective of the present invention, to provide a process for the manufacturing of said bonding system for glazing assemblies, by which a reliable and strong adherence and sealing properties of the system is achieved;

It is still a main objective of the present invention, to provide a process for the manufacturing of said bonding system for glazing assemblies, of the above disclosed nature which, because of the type of components intervening in the system, can be produced in a continuous production line including a molding equipment, simplifying and accelerating the production process.

These and other additional objects and advantages of the present invention will be evident to those persons having ordinary skill in the art, from the following detailed description of the invention with reference to specific embodiments thereof, illustrated in the accompanying drawings

DETAILED DESCRIPTION OF THE INVENTION

Figure 1:
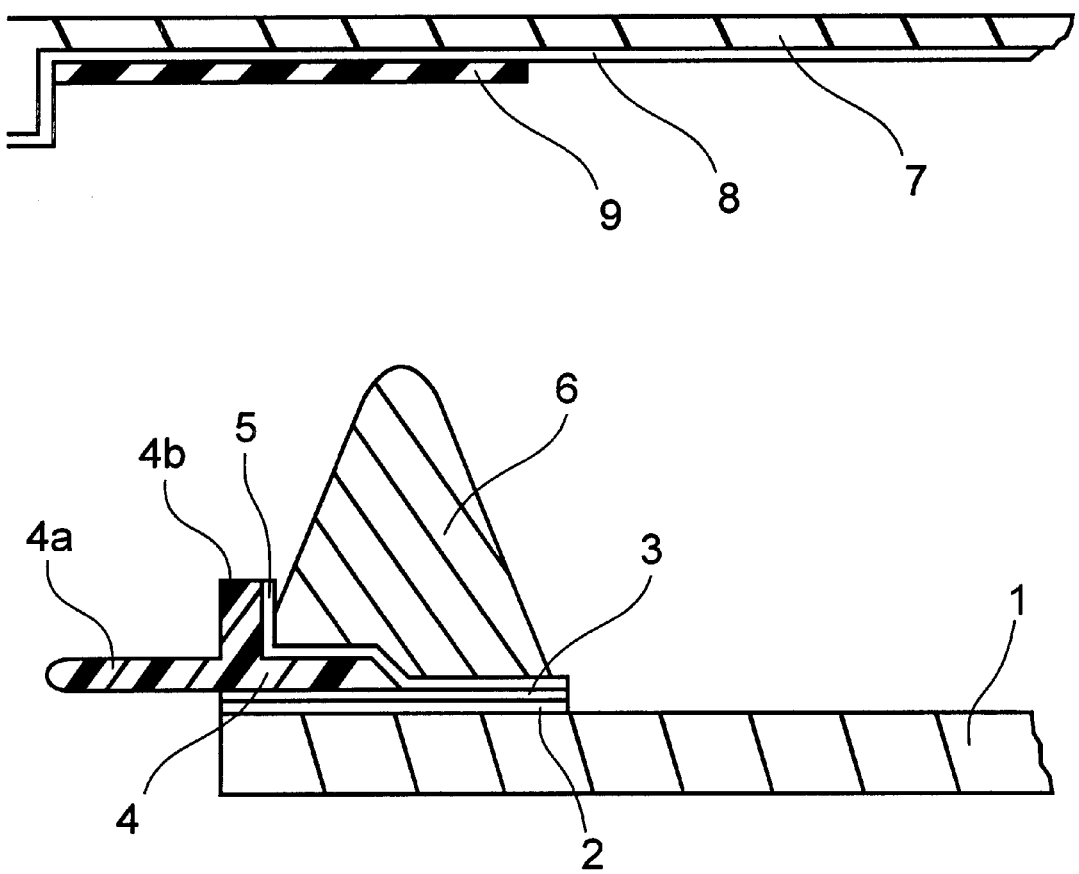
FIG. 1 is a sectional view illustrating the bonding system for glazing assemblies, for mounting a glass pane on a bay of a vehicle.

A bonding system for glazing assemblies for mounting a glass pane on a bay of a vehicle, generally illustrated in FIG. 1, comprising:

a glass pane 1 having a peripheral edge;

a first film 2 of a coupling agent, bonded to a portion of a glass pane 1, preferably placed on the periphery of an external surface next to the edge of the glass pane 1;

a second film 3 of a primer, bonded to said first film 2;

a gasket 4 formed on a portion of the second film 3, adhered to said second film 3;

a third film 5 of a chemical extender, on a portion of the gasket 4 and on a portion of the second film 3, bonded to said portion of the gasket 4 and the portion of said second film, linking them to each other;

a projecting molding of a sealant 6 on said third film 5, bonded to said third film 5;

a chemical coating 8, bonded to a bay 7 of a vehicle (not illustrated); and a fourth film 9 of a primer, bonded to said chemical coating 8, to be bonded in turn with the sealant 6, firmly retaining adhered the glass pane 1 to said bay 7 of the vehicle.

The materials from which of the coupling agent 2, the primers 3 and 9, the gasket 4, the extender 5, the projecting molding sealant 6 and the chemical coating 8 can be selected, are individually well known in the art and in commerce.

For example, the material of the coupling agent 2, can be preferably selected from the organo functional-silane chemicals such as those known in the market as the Betaseal 435.18 sold by the company ESSEX, as well as gamma-aminopropyltriethoxysilane, gamma aminopropyltrimethoxysilane, N-beta(aminoethyl)-gamma aminopropyl-trimethoxysilane, sold by the company Union Carbide, and Chemlok 134, 144 and others sold by the company Lord Corp.

The material for the primers 3 and 9, can be selected from polymers such as those known as Sika Primer 206J sold by Sika Corp., whose chemical basis is an epoxy resin in solution; Also, they can be selected from a solution of polymers such as that known as Betaseal 435.20A sold by ESSEX and, in case that the gasket material be selected from a PVC, a mixture of polymers in solvent basis such as that known as Chemlok EP6907-19 sold by Lord Corp., can be used and, for primers which are applied on acrylic or epoxy coatings, or enamel paints, these can be selected from products known as Betaseal 435.33 and 435.48 sold by ESSEX.

The gasket 4, can be selected from any suitable material known for such purpose, organic or inorganic, preferably from polymeric materials such as the polyurethane, the PVC, the EPDM or the NYLON, etc.

The material of the extender 5, can be a solution of chemical compounds selected from the group of the aminosilanes and/or from the mercaptosilanes, such as the gamma-mercapto-propyltrimethoxysilane. Also it is possible to use titanates and zirconates such as the isopropoxytri-(dioctylpyrophosphate)titanate, as well as some chromium-containing materials. A product which has been used with good results, is that known as the AMV 181800 Betaseal Activator, sold by ESSEX.

As to the projecting molding sealant 6, this can be selected mainly from materials having resilient properties such as the polyisobutylenes PIB, the chemical curing systems based on a limited variety of polymers, such as the polysulphide, silicone and poliurethane.

And last but not least, the chemical coating 8 can be any anticorrosive material, preferably from the group of the acrylates, epoxy, or those known as enamel coatings.

Figure 3:
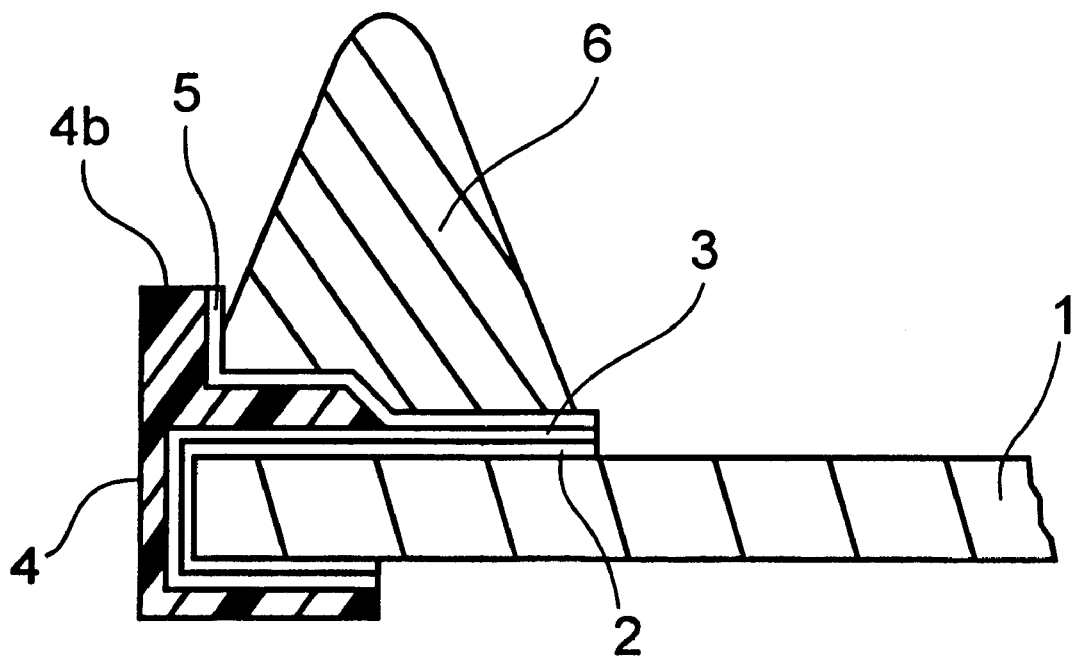
FIG. 3, is a sectional view illustrating a second embodiment of the bonding system illustrated in FIG. 1.
Figure 4:
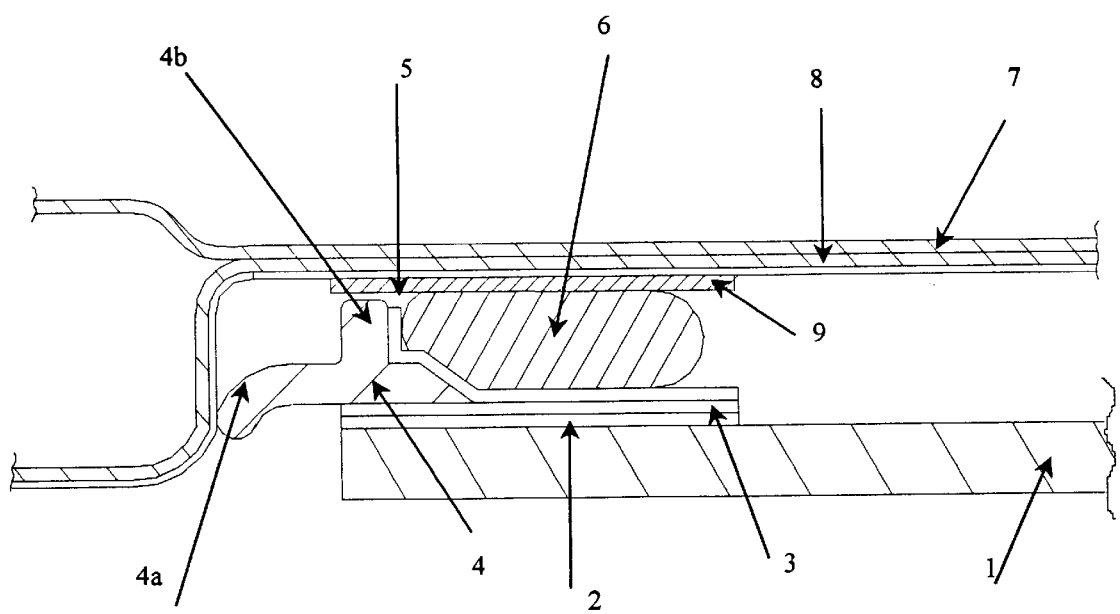
FIG. 4, is a sectional view illustrating the whole glazing assembly, including the bonding system of the present invention.

In an embodiment of the invention, illustrated in FIG. 3, the films 2 and 3 and the gasket 4 may be formed surrounding the edge of the glass pane 1, by both edge surfaces thereof, and the gasket may be preferably formed by the so known "Reaction Injection Molding" process.

For the purpose of aesthetic and to provide a protection for the components of the bonding system against degradation caused by heat and sun light, it would be convenient to provide an enamel coating (not shown) between the first film 2 and the glass pane 1.

The gasket may conveniently include an integrated heel portion 4b, having two functions, one as spacer and other to improve the bond of said third film 5 and said projecting molding sealant 6.

Figure 2:
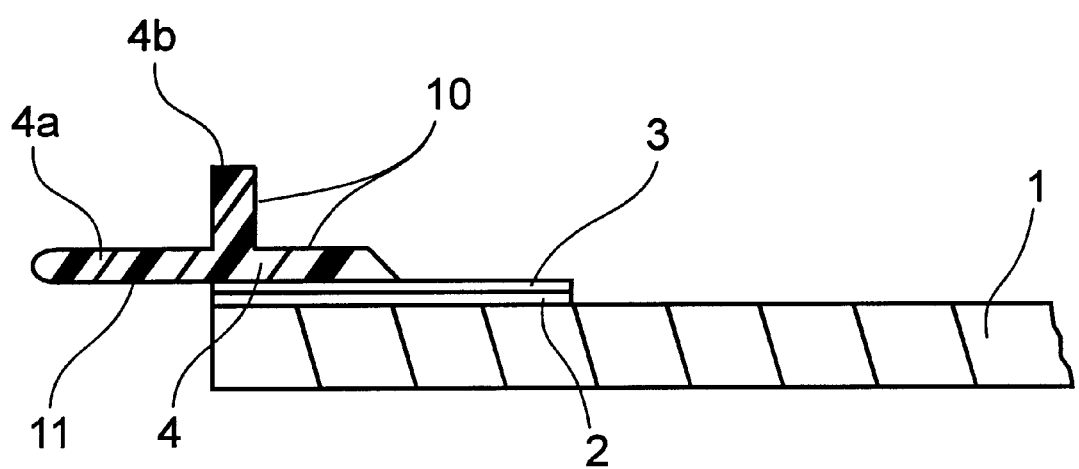
FIG. 2, is a sectional view illustrating a first embodiment of the bonding system illustrated in FIG. 1.

Furthermore, the whole external surface of the gasket 4 or at least the heel portion thereof, may have a rough surface finishing 10 (FIG. 2) formed during the gasket molding, to improve the adherence properties with the third film 5.

Also, the gasket 4 may include a projecting edge 4a having a rough finishing surface 11 (FIG. 2), sealing the open case of the car body in order to reduce squeaking.

As to the process for providing a bonding system for glazing assemblies, to be mounted on an open case of a vehicle, this comprises:

depositing a first film 2 of a coupling agent on a portion of a glass pane 1, allowing said film to be bonded to said glass pane 1;

depositing a second film 3 of a primer on said first film 2 allowing said second film 3 to be bonded to said first film 2;

depositing a gasket 4 on a portion of the second film 3, allowing the gasket 4 to be bonded to the second film 3;

depositing a third film 5 of an extender, on a portion of the gasket 4 and on a portion of the second film 3, to be bonded to said portion of the gasket 4 and to said portion of the second film 3 linking them to each other;

depositing a projecting molding of a sealant 6 on said third film 5, allowing said projection molding sealant 6 to be bonded to said third film 5;

providing a bay structure by:

depositing at least one chemical coating 8 on the bay 7 of a vehicle (not shown), allowing said coating to be bonded with the bay;

depositing onto said coating 8 a fourth film 9 of primer, allowing said fourth film 9 to be bonded to said chemical coating 8; and placing said glazing structure on said bay structure to be bonded to each other.

As above expressed, before the deposition of the bonding system, an enamel coating can be conveniently provided on the glass pane before the deposition of the first film 2 on said glass pane 1.

Furthermore, in order to simplify and accelerate the glazing production process, the gasket 4 can be produced in a continuous production line including a molding equipment for using the so known Reaction Injection Molding process.

And last, but not least, it is to be understood that the invention is not limited to the above disclosed specific embodiments of the bonding system and of the process for the manufacture thereof, and that the persons having ordinary skill in the art will be able to introduce changes into the components and steps in view of the teachings of this invention, which will be within the true scope of the invention as claimed in the following.

We claim:

1. A bonding system for glazing assemblies for mounting a glass pane on a bay of a vehicle, comprising:

a glass pane;

a first film of a coupling agent, bonded to a portion of the glass pane;

a second film of a primer, bonded to said first film;

a gasket formed on a portion of the second film, adhered to said second film;

a third film of a chemical extender, on a portion of the gasket and on a portion of the second film and said portion of the gasket and linking them to each other;

a projecting molding of a sealant bonded to portions of said third film, which are bonded to said second film and said gasket;

a chemical coating, bonded to a bay of a vehicle; and a fourth film of a primer, bonded to said chemical coating, to be bonded in turn with the sealant, whereby the glass pane is retained firmly adhered.

2. The bonding system of claim 1, wherein said gasket includes: an integrated heel piece having a rough surface finishing formed during the gasket molding, performing two functions, as spacer between the glass pane and the bay of the vehicle and for improving the bonding between said third film and said projecting molding sealant; and a projecting edge comprising a rough surface finishing coated with a chemical agent, to avoid squeaking.

3. A process for providing a bonding system for glazing assemblies, to be mounted on an open case of a vehicle, comprising:

providing a glazing structure by:

depositing a first film of a coupling agent on a portion of a glazing, allowing said film to be bonded to said glazing;

depositing a second film of a primer on said first film allowing said second film to be bonded to said first film;

depositing a gasket on a portion of the second film, allowing the gasket to be bonded to the second film;

depositing a third film of an extender on a portion of the gasket and on a portion of the second film, allowing it to be bonded to said portion of the gasket and to said portion of the second film, and linking them to each other;

depositing a projecting molding of a sealant on portions of said third film, which are bonded to said second film and said gasket, allowing said projection molding sealant to be bonded to said third film;

providing an open case structure by:

depositing in an open case at least one chemical coating, allowing said coating to be bonded with the open case;

depositing onto said coating a fourth film of primer, allowing said fourth film to be bonded to said chemical coating; and placing said glazing structure on said open case structure to be bonded to each other.

4. The process as claimed in claim 3, wherein said gasket is formed by reaction injection molding.

5. The process as claimed in claim 3, wherein an enamel coating is provided between the first film and said glazing.

* * * * *